(12) United States Patent
Bailey et al.

(10) Patent No.: US 9,327,850 B2
(45) Date of Patent: May 3, 2016

(54) POWDER DOSER

(71) Applicant: 3P INNOVATION LIMITED, Warwickshire (GB)

(72) Inventors: Thomas Bailey, West Midlands (GB); Michael Edkins, West Midlands (GB); David Seaward, West Midlands (GB)

(73) Assignee: 3P INNOVATION LIMITED, Warwickshire (GB)

( * ) Notice: Subject to any disclaimer, the term of this patent is extended or adjusted under 35 U.S.C. 154(b) by 495 days.

(21) Appl. No.: 13/734,105

(22) Filed: Jan. 4, 2013

(65) Prior Publication Data

US 2013/0126041 A1    May 23, 2013

(30) Foreign Application Priority Data

Jul. 8, 2010  (GB) .................................. 1011491.6
Jul. 8, 2011  (WO) ................ PCT/GB2011/051279

(51) Int. Cl.
  *B65B 1/46* (2006.01)
  *B65B 1/06* (2006.01)
  *B65B 1/08* (2006.01)
  *B65B 1/32* (2006.01)
  (Continued)

(52) U.S. Cl.
  CPC ... *B65B 1/46* (2013.01); *B65B 1/06* (2013.01); *B65B 1/08* (2013.01); *B65B 1/32* (2013.01); *B65B 37/04* (2013.01); *B65B 37/18* (2013.01); *B65B 39/004* (2013.01); *G01G 13/024* (2013.01); *G01G 13/06* (2013.01)

(58) Field of Classification Search
  CPC .............. B65B 1/06; B65B 1/08; B65B 1/32; B65B 1/46; B65B 37/04; B65B 37/18; B65B 39/00; B65B 39/004; G01G 13/024; G01G 13/06; G01G 13/24

USPC ........ 141/71–80, 83, 331, 344, 345; 222/199, 222/202, 203, 235, 544, 412, 241
See application file for complete search history.

(56) References Cited

U.S. PATENT DOCUMENTS 3,346,917 A * 10/1967 Lennox ......................... 425/145
4,337,880 A    7/1982 Rozmus
(Continued)

FOREIGN PATENT DOCUMENTS

DE    3018317 A1    11/1981
EP    2060882 A2    5/2009
(Continued)

OTHER PUBLICATIONS

International Search Report and Written Opinion mailed Jan. 2, 2012, for corresponding international application PCT/GB2011/051279; all references cited herein.
(Continued)

*Primary Examiner* — Timothy L Maust
*Assistant Examiner* — Timothy P Kelly
(74) *Attorney, Agent, or Firm* — Olive Law Group, PLLC

(57) ABSTRACT

A powder doser for accurately dispensing powder, for example a pharmaceutical substance, into a receptacle, the powder doser comprising a hopper with a tip having an aperture through which powder may flow, a closure to close the aperture and a vibration device configured to agitate the hopper, wherein a first portion of the hopper is formed of flexible material and a second portion proximate the tip is formed of substantially rigid material.

12 Claims, 10 Drawing Sheets

(51) Int. Cl.
*B65B 37/04* (2006.01)
*B65B 37/18* (2006.01)
*B65B 39/00* (2006.01)
*G01G 13/02* (2006.01)
*G01G 13/06* (2006.01)

(56) References Cited

U.S. PATENT DOCUMENTS

| | | | |
|---|---|---|---|
| 5,583,304 A * | 12/1996 | Kalidindi | 73/863.56 |
| 5,735,439 A * | 4/1998 | Heinrici et al. | 222/199 |
| 5,785,761 A * | 7/1998 | Suzuki et al. | 118/612 |
| 6,196,278 B1 * | 3/2001 | Wegman et al. | 141/65 |
| 6,340,036 B1 | 1/2002 | Toyoizumi et al. | |
| 7,204,164 B2 * | 4/2007 | Kalidindi | 73/866 |
| 7,284,574 B2 | 10/2007 | Fontaine et al. | |
| 7,836,922 B2 * | 11/2010 | Poole et al. | 141/72 |
| 8,281,959 B2 * | 10/2012 | Luchinger | 222/235 |
| 8,448,817 B2 * | 5/2013 | Bloechlinger et al. | 222/1 |
| 8,746,294 B2 * | 6/2014 | Koch | 141/72 |
| 2004/0060265 A1 | 4/2004 | Boeckle et al. | |
| 2008/0283555 A1 * | 11/2008 | Luechinger et al. | 222/235 |
| 2008/0302835 A1 | 12/2008 | Luechinger et al. | |

FOREIGN PATENT DOCUMENTS

| | | |
|---|---|---|
| FR | 1493649 A | 9/1967 |
| GB | 2440443 A | 1/2008 |
| JP | 7225145 A | 8/1995 |
| WO | 2012004606 A2 | 1/2012 |

OTHER PUBLICATIONS

Search Report under Section 17(5) for application GB0905962.7 mailed Jun. 23, 2009; all references cited herein.

* cited by examiner

POWDER DOSER

CROSS-REFERENCE TO RELATED APPLICATIONS

This application is a continuation of PCT Patent Application GB2011/051279 filed on Jul. 8, 2011, which designates the United States, which also claims priority to Great Britain Patent Application No. 1011491.6 filed on Jul. 8, 2010, the entire contents of each of which are hereby incorporated by reference.

FIELD OF THE INVENTION

The present invention relates to a powder doser for use with, for example, pharmaceutical substances, usually in the range of 0-500 mg. The present invention also relates to a transfer system whereby metered powder is transferred, preferably from a free-standing receptacle to a container.

BACKGROUND OF THE INVENTION

It is known to use powder dosers with a variety of means of controlling powder flow rate to dispense powder for pharmaceutical purposes. For the purpose of this application powder is defined as a 'finely divided solid'. It is important that the correct amount (mass) of powder is provided to the end consumer in order that the drug has the correct efficacy and is safe.

Many existing powder dosers use volumetric systems for measuring powder which are fast, but whose accuracy may be compromised if the powder density varies from that expected.

Volumetric systems typically suffer from poor dose to dose accuracy and the mean weight can often be in error relative to the target weight.

Gravimetric systems weigh powder as it is being filled directly into a product or into a receptacle for subsequent transfer. Gravimetric systems can be very accurate but are traditionally considered too slow for production. Gravimetric systems are considered slow because of the time taken to weigh, combined with the variability in powder flow characteristics.

Many powder dosers have an aperture through which powder is released with a closure to control powder flow rate through the aperture. Such arrangements can lead to problems with durability, as closures can cause wear around apertures after repeated opening and closing cycles. Using harder materials that would increase durability can lead to degrading performance with time as powders stick to and clog the internal surfaces.

U.S. Pat. No. 7,284,574 discloses a system in which a hopper containing a reciprocating stirrer is used to improve powder flow rate and dispensing speed. A problem with this system is that the design of the stirrer and its reciprocating nature means that a significant proportion of the powder in the hopper can be left unstirred, and may therefore remain in the hopper.

It is desirable to provide a powder doser which can accurately and consistently dispense a range of quantities of powder at a suitable speed. It is further desirable to provide a system capable of dispensing each dose into individual containers. Such a system may include a transfer system for this purpose due to the nature of some multi-dose packaging or containers which do not facilitate the weighing of individual doses.

SUMMARY OF THE INVENTION

According to the present invention there is provided a powder doser for accurately dispensing powder, for example a pharmaceutical substance, into a receptacle, the powder doser comprising a hopper with a tip having an aperture through which powder may flow, a closure to close the aperture and a vibration device configured to agitate the hopper, preferably wherein a first portion of the hopper is formed of flexible material and a second portion proximate the tip is formed of substantially rigid material.

The first portion may be of resilient material. The second portion may be formed of metal or metal alloy, preferably stainless steel or tungsten carbide. The second portion may extend between 5% and 100%, preferably between 15% and 50%, of the way up a conical portion of the hopper.

The vibration device may be configured to agitate the hopper through the second portion, and/or may be remote from the second portion, and may be linked to the hopper by means of a rod arm, preferably vertical. The vibration device may be a piezo-electric actuator.

The powder doser may further comprise a pin located within the hopper proximate the aperture and arranged to reciprocate in relation to the aperture, and the closure may be the pin. The powder doser may further comprise a stirrer located within the hopper and arranged to rotate within the hopper. The pin may be arranged to rotate with the stirrer, or the stirrer may be arranged to rotate independently of the pin. The powder doser may comprise a plurality of or two inner stirrers, and/or may comprise a plurality of or two outer stirrers.

The powder doser may comprise a dispensing system and a drive system, wherein the dispensing system is linked to the drive system by means of a releasable coupling, and wherein the dispensing system is detachable from the drive system through operation of the releasable coupling.

There is further provided a powder doser for accurately dispensing powder, for example a pharmaceutical substance, into a receptacle, the powder doser comprising a dispensing system having a hopper and a drive system, wherein the dispensing system is linked to the drive system by means of a releasable coupling, and wherein the dispensing system is detachable from the drive system through operation of the releasable coupling.

The releasable coupling may be a magnetic coupling. The dispensing system may have an upper end and a lower end, and the lower end may include an aperture through which powder may flow, and the magnetic coupling may be positioned proximate the upper end.

The dispensing system may comprise a hopper having an aperture through which powder may flow, a pin located within the hopper proximate the aperture and arranged to reciprocate in relation to the aperture and a closure to close the aperture. The closure may be the pin.

The dispensing system may further comprise a stirrer located within the hopper and arranged to rotate within the hopper. The pin may be arranged to rotate with the stirrer, or the stirrer may be arranged to rotate independently of the pin. The powder doser may comprise a plurality of inner stirrers and/or a plurality of outer stirrers.

There is yet further provided a powder doser for accurately dispensing powder, for example a pharmaceutical substance, into a receptacle, the powder doser comprising a hopper having an aperture through which powder may flow and a vibration device configured to agitate the hopper.

The vibration device may be remote from the hopper, and may be linked to the hopper by means of a substantially vertical rod arm. The vibration device may be a piezo-electric actuator.

There is yet further provided a powder doser for accurately dispensing powder, for example a pharmaceutical substance, into a receptacle, the powder doser comprising a hopper having an aperture through which powder may flow, a pin located within the hopper proximate the aperture and arranged to reciprocate in relation to the aperture, at least one stirrer located within the hopper and arranged to rotate independently of the pin and a closure to close the aperture. The pin is preferably used as the closure. A portion of the or each stirrer may be proximate the aperture.

A vibration device such as a piezoceramic crystal actuator may be used to agitate the hopper. Alternatively, a solenoid actuator or an eccentrically loaded motor may be used. The pin may be configured so as to rotate within the hopper, and its vertical motion may be used to expel a quantity of powder through the hopper's aperture. The or each stirrer and/or the hopper may be formed from a flexible material. The hopper may be shaped so that it has an angled lower wall, and the or each stirrer may be arranged so as to be substantially parallel to and proximate that wall, and at a constant vertical distance from it.

The powder doser may also include a drive system, which may be substantially in one plane. A series of powder dosers with drive systems may be configured to allow concurrent dispensing into a formation of receptacles, and may be offset to one another. A series of at least three powder dosers with drive systems may be configured in two rows with a staggered relationship between the individual powder dosers.

There is also provided according to a further aspect of the present invention a powder doser system comprising a powder doser with drive system, a weighing device and a control system, where the control system is configured to dispense a predetermined amount of powder into a receptacle positioned on the weighing device. The control system may be configured to optimise dispensing accuracy by varying one or more of stirrer rotation speed, vibration frequency, vibration amplitude and pin reciprocation distance, or may be configured to optimise dispensing speed by varying one or more of stirrer rotation speed, vibration frequency, vibration amplitude and pin reciprocation distance.

There is further provided a control system for a powder doser comprising a hopper having an aperture through which powder may flow; a pin located within the hopper proximate the aperture and arranged to reciprocate in relation to the aperture; at least one stirrer located within the hopper and arranged to rotate; a vibration device configured to agitate the hopper; and a closure to close the aperture the control system being configured to operate the powder doser to optimise dispensing accuracy or speed by controlling at least one of rotation of the or each stirrer, vibration amplitude and/or frequency of the vibration device and/or motion of the pin. The control system may be configured to operate the powder doser such that flow rate is altered during dispensing of powder from the doser, and the control system may be configured to operate the powder doser such that flow rate is decreased as a predetermined target weight is approached.

A transfer system for metered powder is also provided according to another aspect of the present invention, having at least one receptacle and comprising a first station configured such that the receptacle may be weighed by a weighing system whilst being filled by a dosing system, a second station configured to discharge the powder to a container and a drive to drive the receptacle from the first to the second station. The second station may include an inverting mechanism configured to discharge powder to the container. The receptacle may be moveable with respect to its base, and may be biased into a first supporting position then lifted from its base to be weighed The transfer system drive may be configured to drive an arm supporting the base in a rotary motion between the first and second stations. The drive may also be configured to move vertically to enable the receptacles to be presented to the weigh cell. The transfer system may comprise more than one arm, each supporting a receptacle, or more than one receptacle, so that in a first position the receptacles are arranged in two parallel rows and staggered so that when inverted to a second position they are brought into a single aligned row with a pitch between receptacles half that of the pitch when in the first position. There may also be provided a cleaning system configured to clean discharged receptacles between the second station and the first station.

The present invention, therefore, allows precise dispensing by means of firstly the independent stirrer and pin providing a smooth, controllable flow rate, and secondly the incremental weighing of powder as it is dispensed. Powder may be dispensed in the range of 0 to 500 mg, more typically in the range of 1 mg to 100 mg with 1-10 second dose times.

A preferred embodiment of the invention is now described with reference to the accompanying drawings in which:

DETAILED DESCRIPTION OF THE EMBODIMENT(S)

Figure 1:
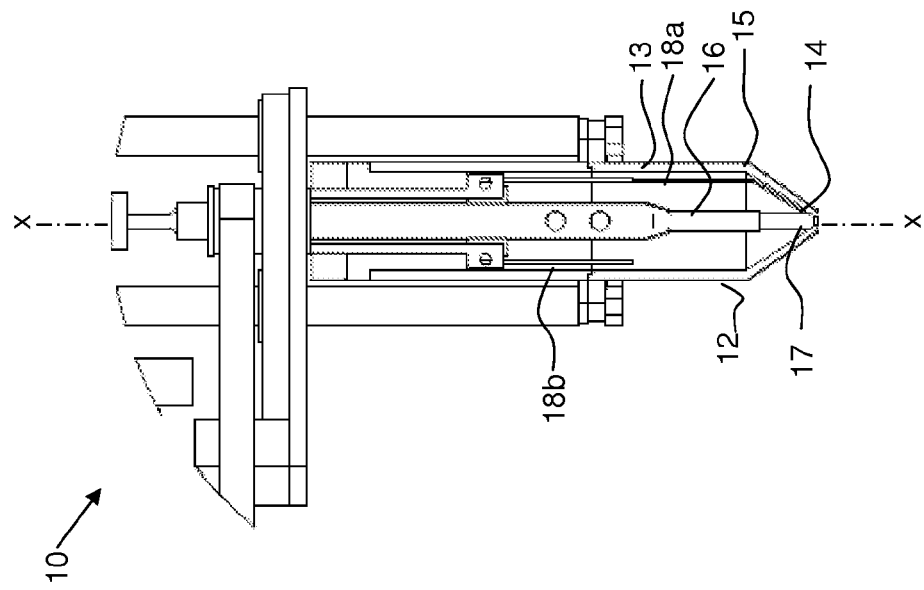
FIG. 1 shows a side view of the powder doser in partial cross-section according to an embodiment of the present invention

With reference to FIG. 1, a powder doser 10 according to an embodiment of the present invention comprises a hopper 12 having an upper cylindrical portion 13 and a lower inverted conical portion 15. The cylindrical and conical portions 13 and 15 are co-axially aligned with the axis X-X extending substantially vertically. The hopper 12 has an aperture 14 at its lowest point, and a generally cylindrical pin 16 and two stirrers 18a and 18b located within the hopper. The aperture is in this embodiment circular and has a diameter of between 1 mm and 6 mm. The pin 16 is aligned with the axis X-X and is arranged to rotate as well as reciprocate with respect to the aperture 14 as described in more detail below, in order to reduce 'bridging' of the powder in a region proximate the aperture 14. Powder is further agitated by the stirrers 18a and 18*b*, which are arranged to rotate independently of pin 16 and do not reciprocate. The pin 16 also acts as a closure for the aperture 14, in this embodiment.

The hopper 12 is made from a flexible material such as silicone rubber, allowing it to transmit vibration, be deflected by the stirrer 18*a*, seal on the pin 16 despite any powder build-up and perform a wiping action on the pin with no metal shedding. A further advantage of using silicone rubber for the hopper 12 is that it inhibits adhesion of the powder. The hopper, in certain embodiments, is a disposable item, reducing the need for cleaning and the possibility of cross-contamination. A relatively small hopper 12 is used, allowing the advantages of a short residence time for the powder, leading to reduced ullage, easier cleaning and small batch sizes for early clinical trials in pharmaceutical applications.

In other embodiments the hopper can be made from a rigid or hard material such as stainless steel, tool steel or tungsten carbide, dependent upon particular application requirements.

The stirrers 18*a* and 18*b* are also made of flexible material; in this embodiment stainless steel wire, and in this embodiment are coated with a low friction material such as PTFE. In other embodiments such coatings may not be required or provided. The stirrers 18*a* and 18*b* may be made of "memory metal" such as nickel titanium (nitinol) so that they keep their shape and do not become deformed by powder. The stirrers 18*a* and 18*b* are close to the pin 16, and one 18*a* is close to the aperture 14, in order to minimise the unstirred area proximate the aperture 14. The two stirrers 18*a* and 18*b* are of different lengths and are used to provide stirring throughout the hopper 12. One stirrer 18*a* is angled so that it lies parallel and close to the conical portion 15 of the hopper 12, again to minimise the unstirred area.

In this embodiment, the pin 16 has a flattened tip 17, though in other embodiments the pin 16 may be tapered, concave or domed. The pin 16 is interchangeable with alternative pins (not shown) having a range of diameters and lengths in order to accommodate different dose ranges in conjunction with corresponding hoppers 12. The pin 16 is larger than the aperture 14 in order to provide an interference fit. The pin has a smooth surface finish and is manufactured from stainless steel or some other suitably hard material. In further embodiments the pin 16 may be coated with a low friction material such as PTFE, PEEK or silicone rubber.

Figure 2:
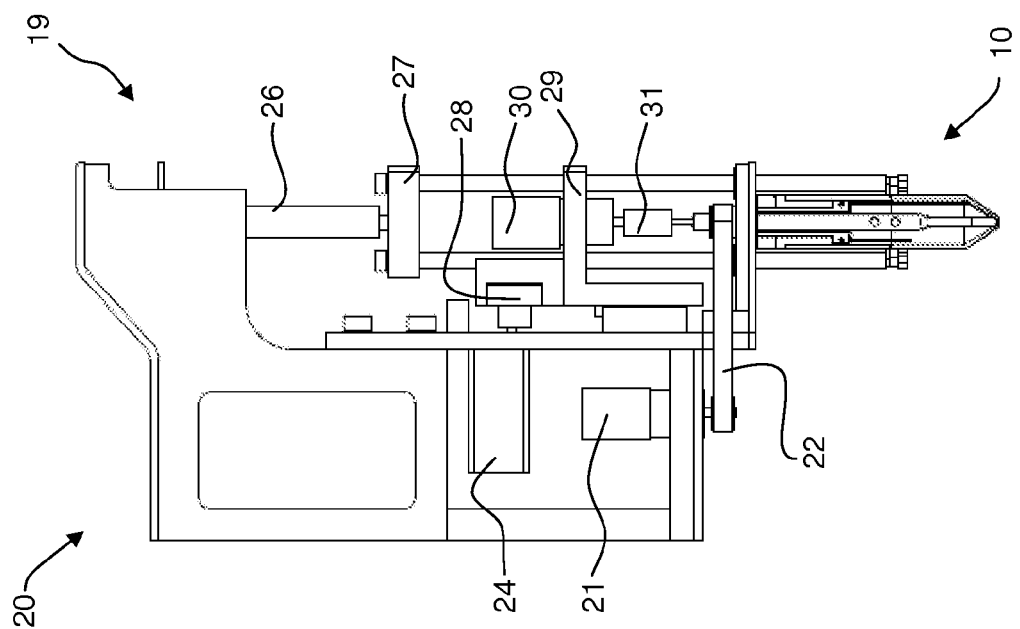
FIG. 2 shows a side view of the powder doser of FIG. 1 with a drive system in partial cross-section.

FIG. 2 shows the doser sub-assembly 19, comprising the powder doser 10 in conjunction with a drive system 20, which includes a stirrer drive motor 21, connected to the stirrer 18 by a belt drive 22, a pin closure drive motor 24 which moves the pin 16 in a reciprocating motion via cam 28 and carriage 29. A pin rotation motor 30 is mounted to carriage 29 and drives the pin 16 via a shaft 31 aligned and connected with the pin 16. The drive system 20 also includes a piezo actuator 26, which is used to vibrate the hopper 12 via a rigid linkage 27 in order to affect powder flow characteristics.

The material infeed arrangement (not shown) for the hopper 12 can be linked to the powder doser's source of vibration and can be independently controlled. An active "pusher" may be required for particularly cohesive powders.

Figure 3:
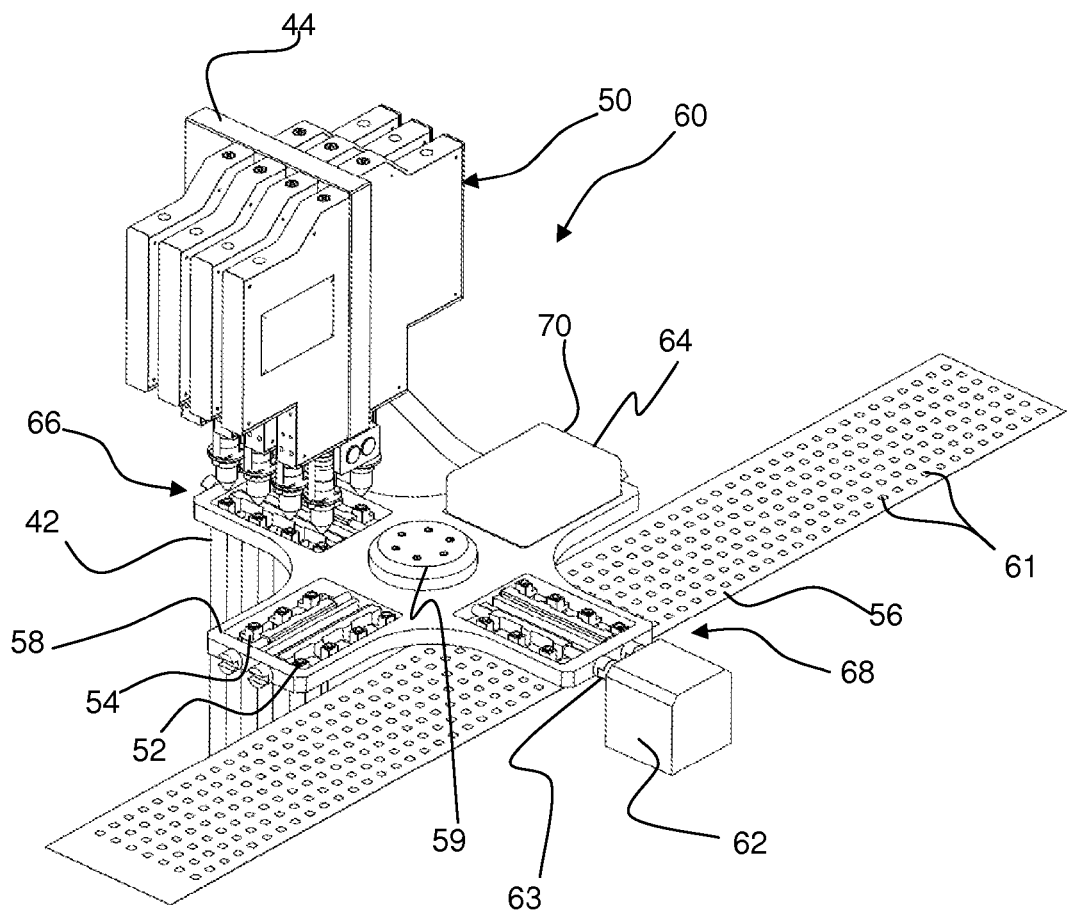
FIG. 3 shows a perspective view of a powder doser system with a transfer system according to another aspect of the present invention.
Figure 7:
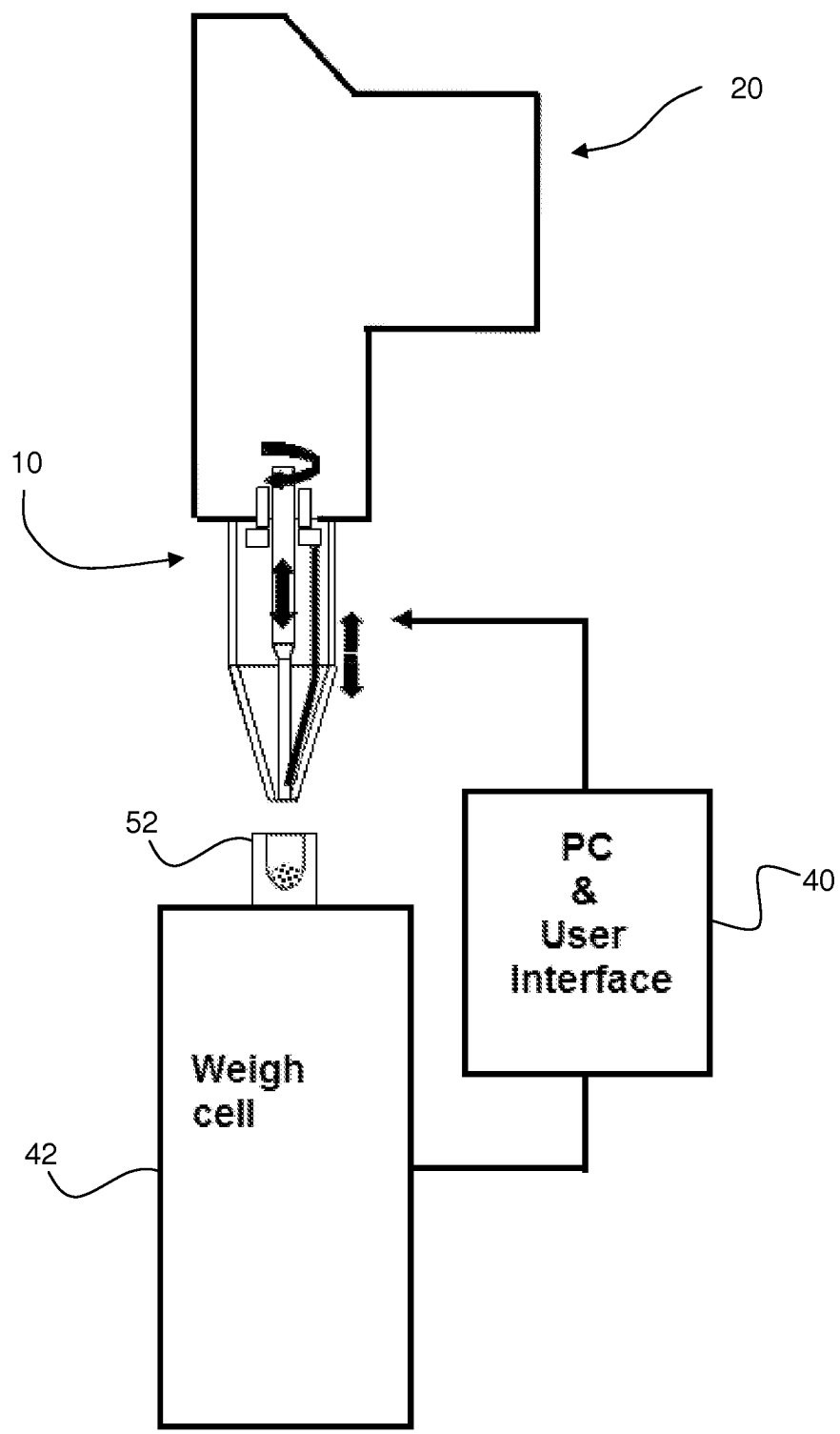
FIG. 7 is a schematic diagram illustrating a control system for the powder doser system.

With reference to FIGS. 3 and 7, a powder doser system 50, comprising a configuration of sub-assembly 19, a weigh cell 42 and a control system 40 is shown. The weigh cell 42 and various drive motors/actuators are electronically connected to the control system 40 using suitable cabling. Specifically, the control system 40 is configured to control the operation of stirrer drive motor 21, pin closure drive motor 24, pin rotation motor 30 and piezo actuator 26. The control system 40 is in the form of a personal computer running appropriate software in this embodiment, but may in other embodiments be a suitably programmed industrial microprocessor controller or the like.

The weigh cell 42 measures the amount of powder being dispensed into a receptacle 52 in real-time and feeds this data to the control system 40, allowing it to manage powder metering. Data recording of each measurement made is achieved via a system that complies with relevant legislation (e.g. US Title 21 CFR Part 11 entitled "Electronic Records; Electronic Signatures").

The control system 40 is programmed to provide a variety of modes to dispense powder from the hopper 12. Typically, a two-stage process takes place whereby the pin is lifted to provide a large aperture to release a fast bulk feed of powder (typically up to of 90% of the total), then lowered to give a small aperture for a lower top-up feed of the balance.

In an alternative mode, the pin 16 is retracted then extended quickly to punch powder from the swept volume with its flattened tip 17. This mode has been found to be particularly effective for producing an accurate dose quickly for certain powders and may be used in combination with other modes, e.g. the top-up mode.

In a further alternative mode, the pin 16 is retracted to provide a large or maximised aperture, then moved through several positions to progressively reduce the aperture size.

For cohesive powders that do not flow well and when large doses are required, it has been found that the most effective mode is to leave the aperture 14 open until a certain weight of powder has been dispensed. The control system 40 closes the aperture before the target weight has been reached on the weigh cell 42, allowing for a certain amount of powder to be still in the process of falling. This "in-flight" powder can be calculated by the control system 40 from the rate at which the weight is increasing and the vertical spacing between the aperture 14 and the receptacle 52.

If high accuracy dosing is required, continuous or quasi-continuous flow control can be used, where the flow is reduced in multiple stages as the target is approached in order to minimise the chances of overshooting the predetermined amount of powder.

For very small doses and/or very mobile powder, the aperture 14 may be set to just closed/just open and vibration applied so that powder flows out of the aperture at an ultra-low rate.

Flow rate can also be altered by the control system 40 rotating the stirrers 18 at different speeds.

In addition to a range of vibration waveforms, amplitudes and frequencies, or various combinations of a reciprocating pin 16 and a rotating stirrer 18, other means can be used to alter flow characteristics. For example, a fluidising gas may be introduced into the hopper (e.g. via a hollow pin with suitable outlets) to produce a desired effect.

Rotating the pin 16 has been found to inhibit adhesion and bridging of powder at the aperture.

The use of a stepper or servo motor to control the rotary motion of the stirrer 18 allows each cycle to be started at the same rotary angle, thereby enhancing the accuracy of the process.

The control system 40 uses information from previous dosing operations to adjust current dosing operations. The system is able to compensate automatically for changes in powder properties. Thus, a first control loop alters the lift of the pin to control effective aperture size for the initial bulk feed in response to previous bulk fill rates. A second control loop alters the effective aperture size for the top-up feed in response to previous top-up fill rates, and a third control loop alters the flow properties of the powder by altering e.g. the drive to the stirrers 18a and 18b or the vibration characteristics in response to previous bulk feed rates compared to target bulk feed rates.

By using the information from the previous dosing operation the control system is self learning and can utilise historical dispensing information to adjust for subsequent dose dispensing, thereby improving the speed and accuracy of the system.

Also shown in FIG. 3 is transfer system 60 according to another aspect of the present invention, which comprises a first station 66 where filling and weighing of the receptacles 52 take place and a second station 68 where powder is discharged from the receptacles 52 into containers 56 (a continuous strip of blister cavities is shown in this embodiment). In this embodiment, it further comprises a third station 70 where cleaning of the receptacles takes place.

Figure 4:
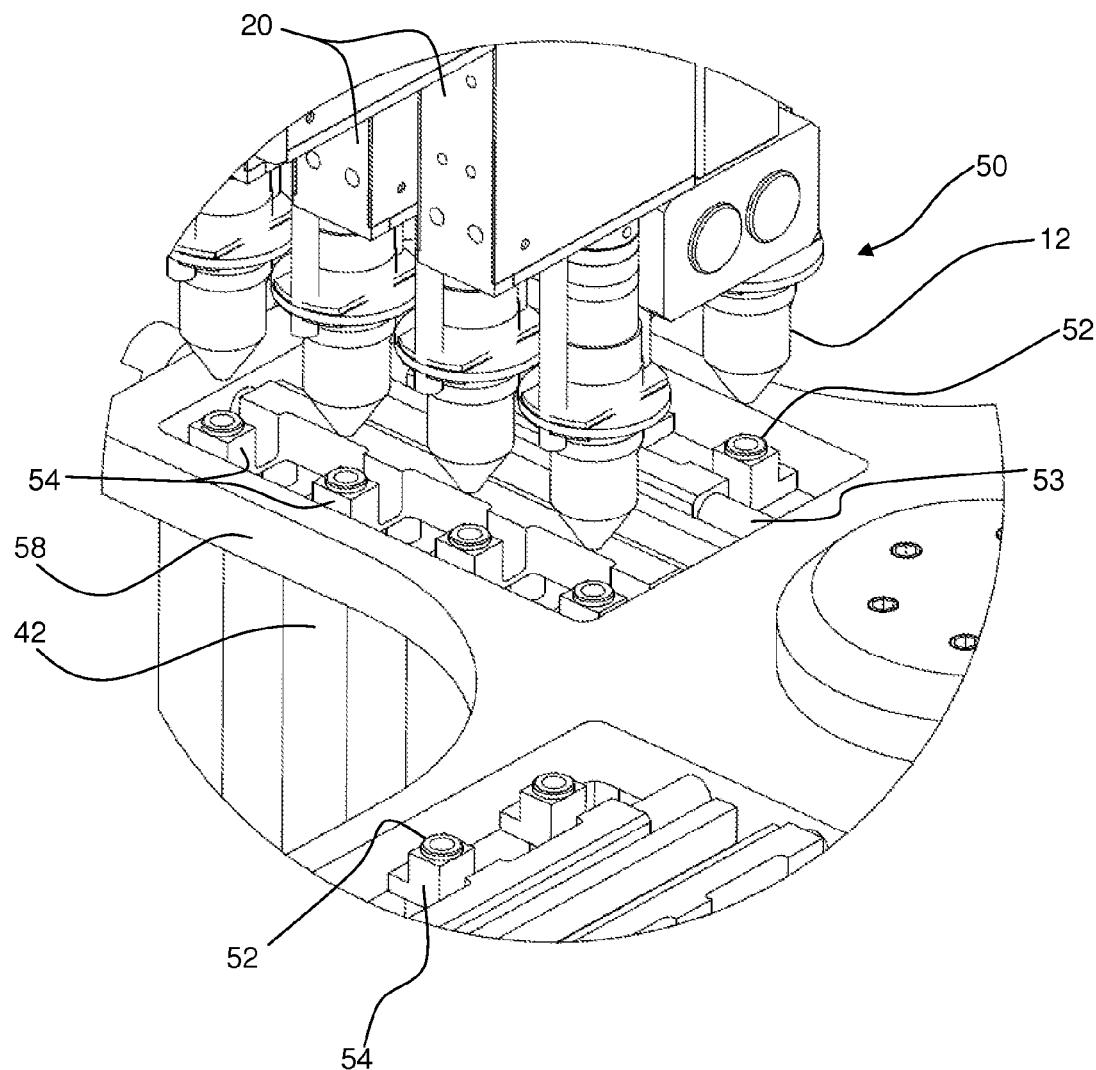
FIG. 4 shows an enlarged perspective view of a portion of the powder doser system with the transfer system of FIG. 3.

The first station 66 can be seen more clearly in FIG. 4. The narrow, planar nature of the drive systems 20 of each doser sub-assembly 19 allows the powder dosers 10 to be positioned in close proximity to one another, in this embodiment at a pitch of approximately 30 mm. The dosers are arranged in two parallel rows offset and staggered with respect to one another. One row comprises four subassemblies 19, and the other three. Each doser sub-assembly 19 is provided as a plug-in module attachable to a central support 44 to allow individual modules to be changed out with minimum downtime. As well as being convenient for reasons of space, this positioning is required to allow the corresponding receptacles 52 to be discharged in a configuration appropriate to the powder containers 56 used (in this embodiment at a 15 mm spacing), as will be described in more detail below.

In this embodiment, four supporting arms 58 mounted on a turntable 59 carry four sets of seven receptacles 52. A drive (not shown) rotates the turntable 59 about a vertical axis, moving the arms 58 from one station to the next. The drive may comprise a servo motor or stepper motor, providing customisation of the arm motion in terms of speed, torque, force and acceleration. There may be an adjustable end stop. The drive is also controlled by the control system 40.

Figure 5:
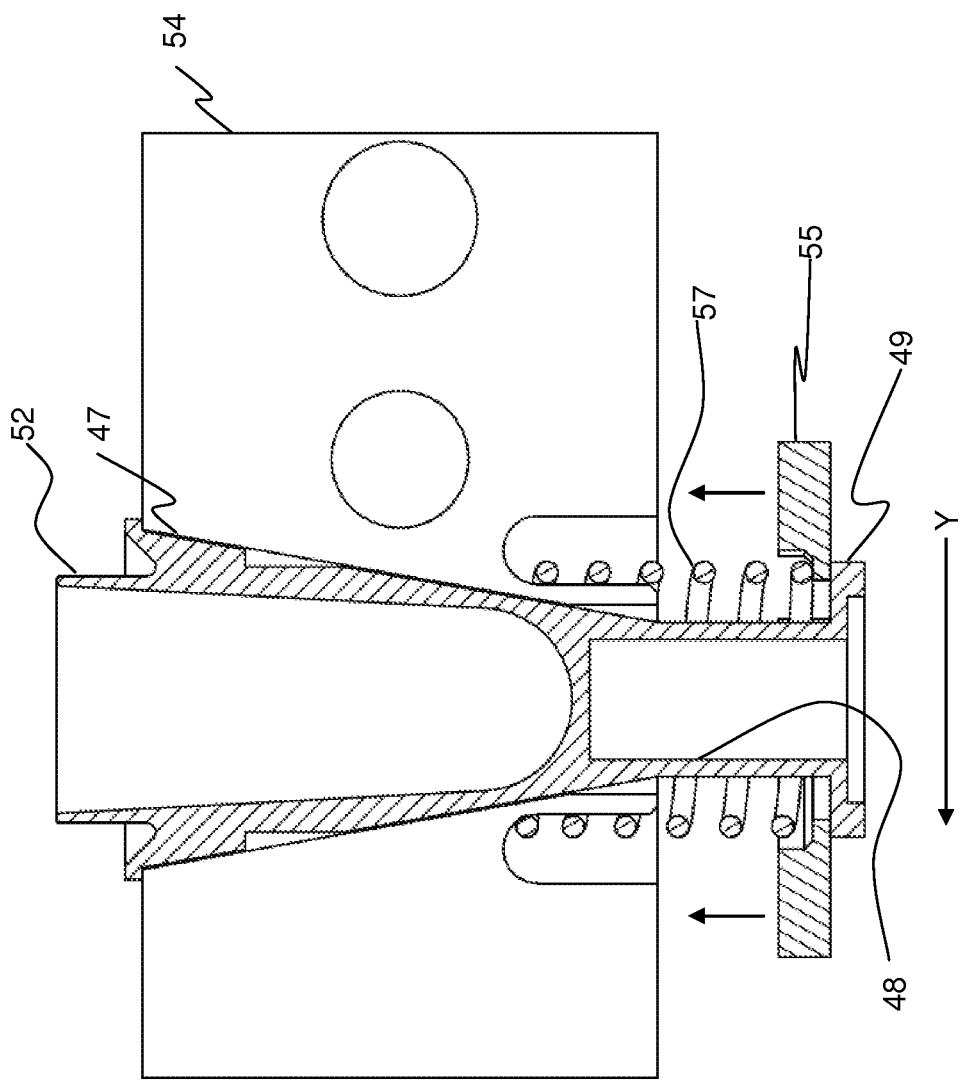
FIG. 5 shows a cross sectional view through a receptacle of the transfer system of FIG. 3 and its support limb or base.
Figure 5:
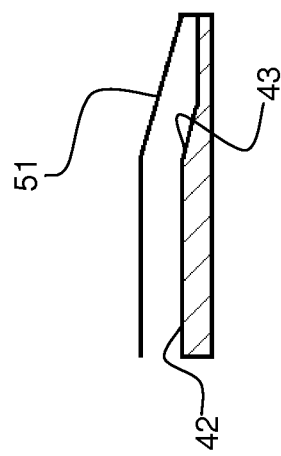

FIG. 5 shows one of the receptacles 52 in more detail. The receptacle comprises a tapered body 47 resting in a corresponding bore of a supporting limb 54, a narrow stem 48 and a widened base 49. A disc 55 of greater diameter than the base rests on the base 49 and a spring 57 extends between the underside of the limb 54 and the disc 55 to urge the receptacle 52 downwardly, thus holding the receptacle 52 solidly to the limb.

Each of the receptacles 52 must be accurately weighed at the first station 66. In order to allow this, as the receptacle base 49 is rotated towards the weigh cell 42 in a direction Y it is brought into contact with a forked ramp 51 which raises the disc 55 and thus compresses the spring 57, allowing the receptacle 52 to move freely in a vertical direction to a certain degree. By utilising a further ramp 43 between the forked ramp 51, further rotation lifts the receptacle 52 onto the weigh cell 42. The receptacle 52 is therefore supported by the weigh cell 42 rather than the supporting limb 54, thus being weighed once in position on the weigh cell 42 whilst being filled.

In alternative embodiments (not shown), the turntable is moved vertically downwards to place the receptacle on the weigh cell whilst releasing the disc, or the arm is pivoted to lower the receptacle on to the weigh cell.

Figure 6C:
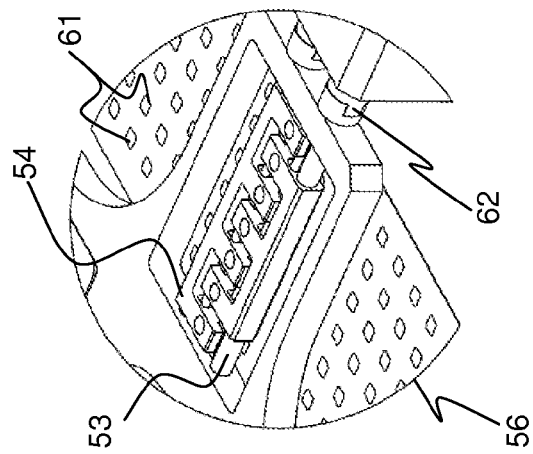
FIGS. 6A, 6B and 6C show perspective views of three different stages of the discharge process taking place at the second station of the transfer system of FIG. 3.
Figure 6B:
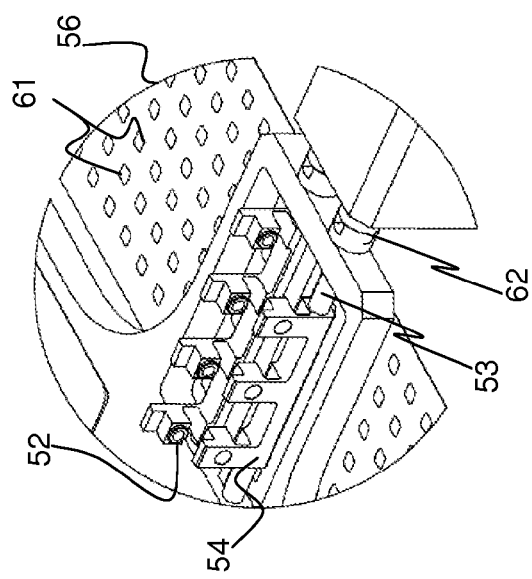
Figure 6A:
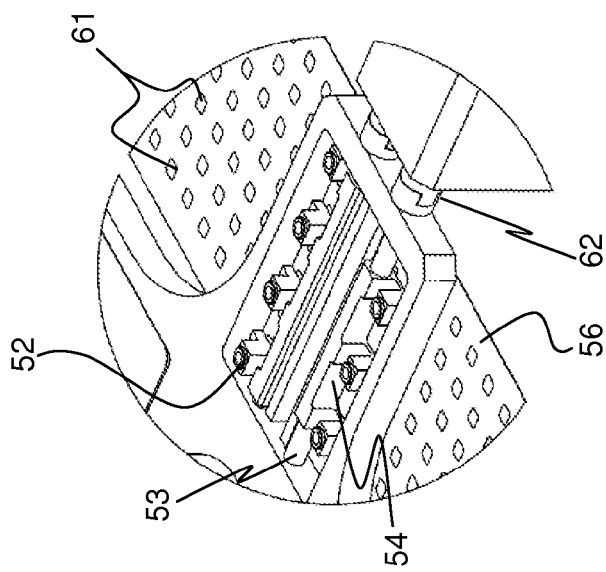

FIGS. 6A, B and C show the filled receptacles 52 at the second station 68 having been rotated from the first station 66. The receptacles 52 are positioned in two rows on first and second shafts 53 supported in one arm 58. Each receptacle 52 is supported in an individual supporting limb 54 connecting it to the shaft 53. The limbs 54 on one shaft 53 are staggered with respect to the limbs 54 of the other shaft 53. Below them is a container 56, in this embodiment a regular array of depressions 61 used to form a series of blister packs. In this embodiment there are seven depressions 61 in each row.

In use, the arm 58 rotates until the end of each shaft 53 engages with an inverting mechanism 62, the end of each shaft 53 having a slot 63 corresponding to the protruding ends of the inverting mechanism 62 drive. The inverting mechanism 62 then rotates the two shafts 53 towards each other through 180°, interleaving the supporting limbs 54 and bringing the receptacles 52 into a single aligned row with a pitch between them of 15 mm. One shaft 53 supports three limbs 54 and three receptacles 52 whereas the other shaft 53 supports four limbs 54 and four receptacles 52.

The receptacles 52 discharge their contents into the corresponding depressions 61 of the container 56 as they are turned. Each spring 57 retains each receptacle in the corresponding limb 54 during inversion in order to reduce movement in the arm and noise. Multiple turns of varying angles of the shafts 53 are preferably made in order to ensure that minimal powder remains in the receptacles 52. The shafts 53 can be stopped at various angles so that the receptacles 52 can discharge powder at a range of angles. The limbs 54 can be rapidly decelerated when the receptacles are over depressions 61 to ensure removal of the powder. For particularly adhesive powders the shafts can repeat the motion several times.

The drive system 62 accelerates faster than gravity until rapidly decelerating over the depressions 61 in order to retain the powder within the receptacles 52.

The limbs 54 can also be driven against a stop (not shown) to provide a tapping or shock load to the receptacles 52 providing means to dislodge residual powder in the receptacle.

Once emptied, the receptacles 52 are returned to their original position and rotated to a cleaning system 64 (see FIG. 3), where any residual powder is removed. Residue in the receptacles 52 prior to cleaning is powder dependent but is typically less than 5%, dropping to less than 2% with higher doses of powder. In some embodiments it may not be necessary to clean between individual discharge cycles or may only be necessary to clean intermittently.

The doser of the present invention permits accurate dosing of powders to be achieved rapidly and cost-effectively. The modular nature of the powder doser system 50 allows it to be used as an individual doser, for example in a lab, or with other powder doser systems 50 on a production line. This scalability of the invention is an important attribute not only in terms of convenience but also when considering regulatory bodies such as the U.S. Food and Drug Administration (FDA) since it may cut down on the need to revalidate a dosing method when it is scaled up to production. When used on a production line, the system is designed to operate in less than 3 seconds and can typically operate in 1.5 seconds.

Further advantages of the present invention include improving traceability by the recording of weight data for up to 100% of individual doses. The invention also allows decoupling of cycle timings of the dosing and transfer system in relation to the overall packaging system (of the blister packs). Specifically, the dispensing and transfer of powder can take place at different rates by comparison with the advancing of the containers being filled as required, to increase flexibility of the process. Furthermore, the number of doser subassemblies can be altered according to the format of packs to be filled.

In alternative embodiments (not shown), the hopper 12 is made at least partially from translucent material, offering a view of the powder within it, and need not be flexible. The hopper 12 may have a PTFE (polytetrafluoroethylene) coating or other non-sick coating on a plastics or metal substrate in order to inhibit adhesion of the powder. The tip 17 of pin 16 can be concave, to further assist the punching of powder from the hopper 12, or may be domed to assist sealing of the aperture 14. There may be more than two stirrers 18 of different lengths, ensuring that stirring occurs throughout the hopper 12 or just one stirrer 18. The stirrer may move vertically. Alternative means of vibration can be used, including a solenoid actuator or an eccentrically loaded motor in place of the piezo actuator 26. A separate closure may be used instead of relying on the pin to be the closure.

The transfer system 60 may have fewer or more than four arms 58 or more. Indeed it may have a single arm 58. The transfer system 60 may not be rotary, instead having a linear conveyor or a shuttle mechanism. The receptacles 52 may be lowered onto the weigh cell 42 rather than raised up to it. The supporting limb 54 may be compliant and the receptacles 52 themselves may be semi-rigid. The transfer system 60 may be implemented in conjunction with different dosers (e.g. volumetric dosers or other prior art dosers), rather than the doser of the first aspect of the present invention.

A second embodiment according to the present invention is shown in FIGS. 8 to 11. In this embodiment, like parts are illustrated by similar reference numerals but with the addition of the prefix "1".

Figure 8:
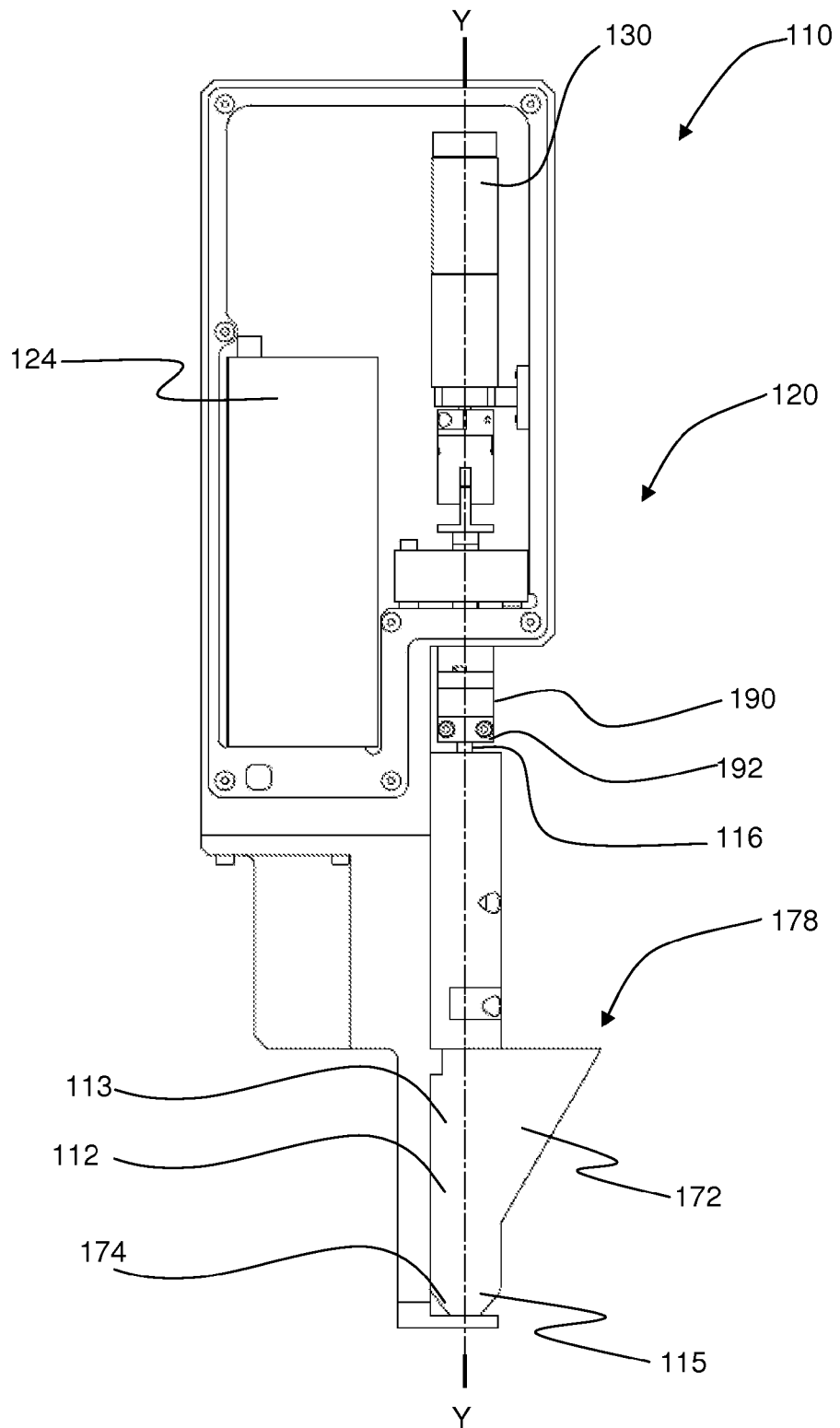
FIG. 8 shows a side view of a powder doser according to a second embodiment of the present invention.
Figure 9:
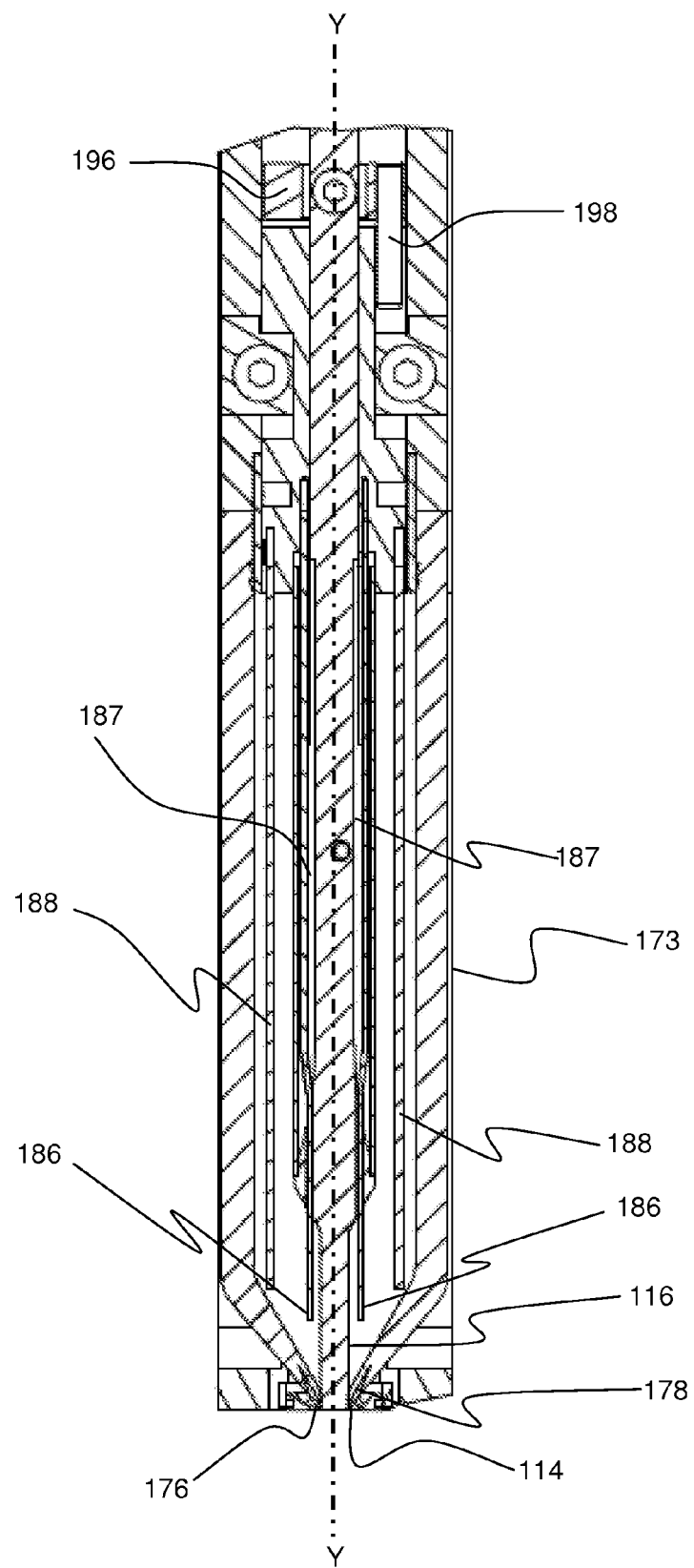
FIG. 9 shows a cross-sectional view of a hopper of the powder doser of FIG. 8.
Figure 10:
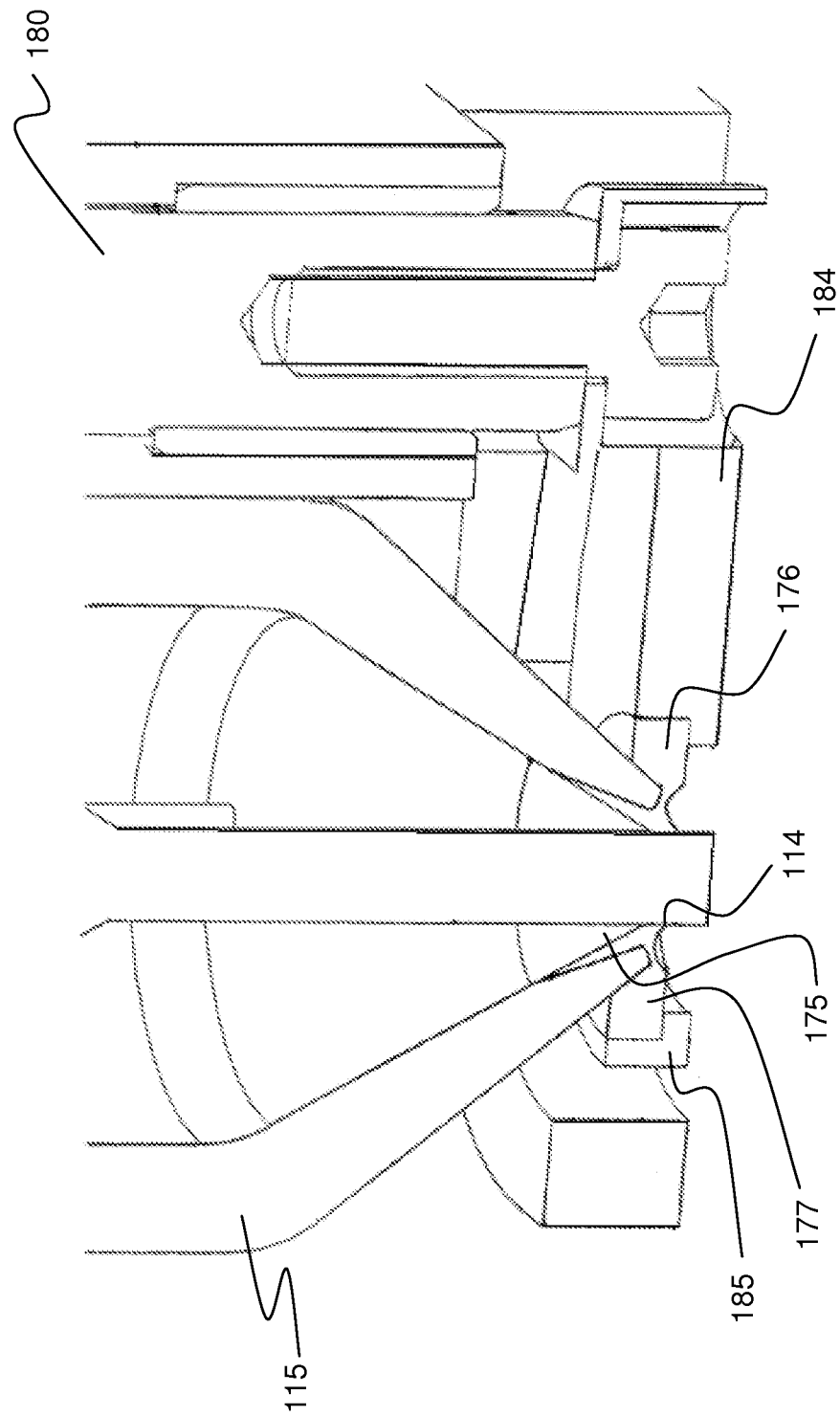
FIG. 10 shows a cross-sectional view of part of the hopper of FIG. 9.

With reference to FIGS. 8 and 9, a powder doser 110 comprises a dispensing system 178 and a drive system 120. The dispensing system 178 includes the hopper 112 with a first portion 173 comprising an upper cylindrical portion 113, a lower conical portion 115 and a side feed 172. The lower conical portion 115 includes a hopper tip 174. The first portion 173 is of a flexible and preferably resilient material such as silicone rubber. The hopper 112 has a second portion in the form of an insert 176, proximate the tip 174, of a substantially rigid material such as metal or metal alloy (e.g. tungsten carbide) (see FIG. 10). In this embodiment the insert 176 is stainless steel, which is preferable for pharmaceutical applications, though other suitable metals and other materials may be used, such as engineering plastics or ceramic materials. The insert 176 has a conical portion 175 and an annulus 177 at the narrow end of the conical portion 175 that define the aperture 114. The conical portion 175 fits inside the lower conical portion 115 of the hopper 112 so that the tip 174 contacts the annulus 177. The conical portion 175 extends between around 5% and 100% of the way up the lower conical portion 115, preferably between 5% and 50% of the way up the lower conical portion 115. In this embodiment, the conical portion 175 extends around 20% of the way up the lower conical portion 115.

The dispensing system 178 also includes the pin 116, which is arranged to rotate and reciprocate with respect to the aperture 114 in order to reduce 'bridging' of the powder in a region proximate the aperture 114. The pin 116 also acts as a closure for the aperture 114. As in the previous embodiment, the pin 116 has a flattened tip, but may be tapered, concave or domed. The upper end of the pin 116, i.e. the end remote from the hopper 112, is held by a collar 192. The pin 116 is connected to the pin closure drive motor 124 which moves the pin 116 in a reciprocating motion via a series of rods 193, and the collar 192. The pin 116 is connected to the rotation motor 130 via a series of shafts 195 and the collar 192.

Figure 11:
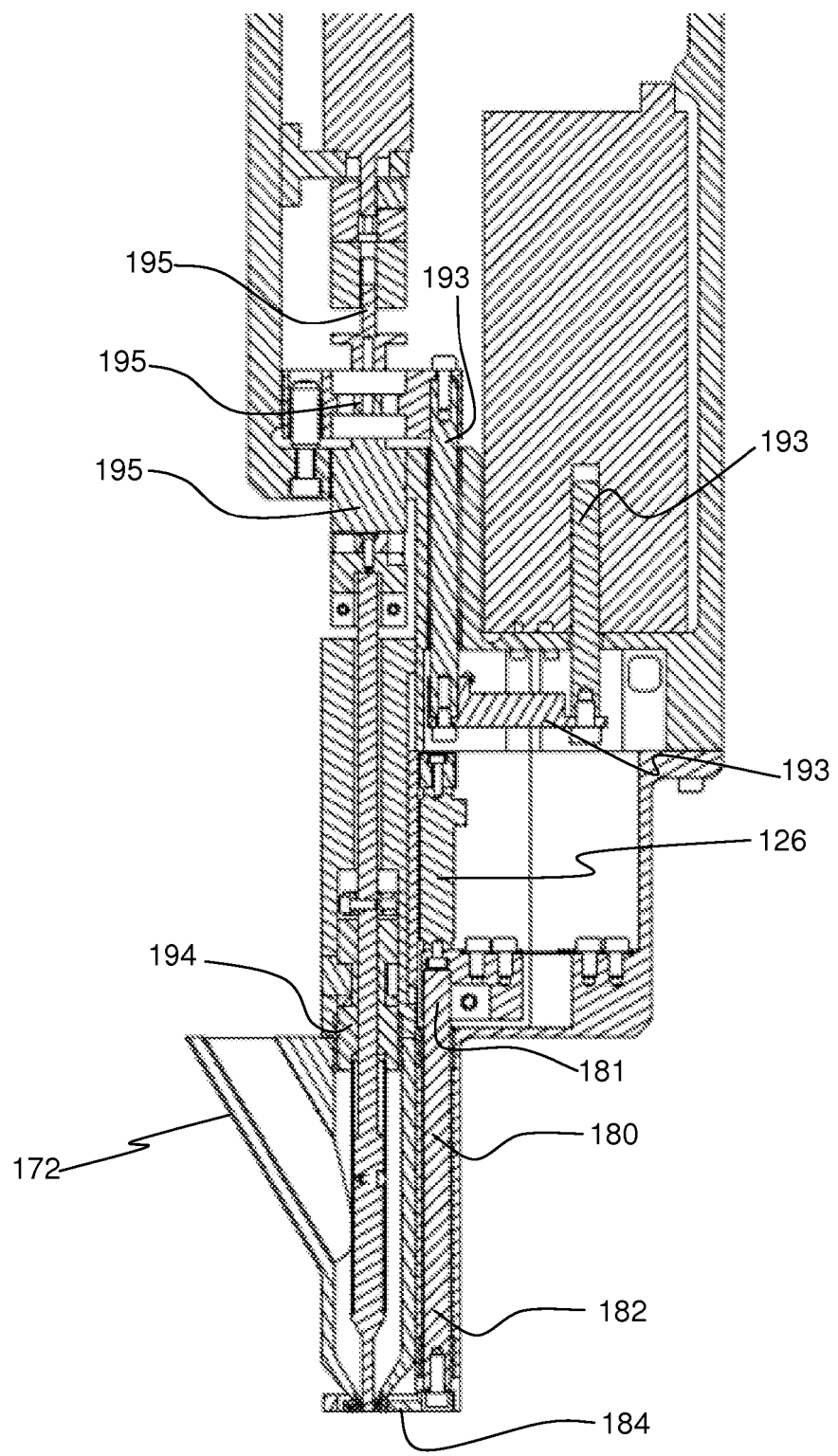
FIG. 11 shows a cross-sectional view of a dispensing system and drive system of the powder doser of FIG. 8.

In this embodiment, the drive system 120 includes a piezo-electric actuator 126 (e.g. as shown in FIG. 11). In alternative embodiments a linear motor or voice coil actuator may be used in place of the piezo-electric actuator 126. The piezo-electric actuator 126 is configured to vibrate the hopper 112 via a substantially vertical rod arm 180 having a first end 181 and a second end 182. The first end 181 is connected to the piezo-electric actuator 126 and the second end 182 is linked to a connecting member 184 that surrounds the annulus 177 of the insert 176. The insert 176 is supported in the connecting member 184 by a lip 185. The insert 176 is preloaded against the connecting member 184 by the resilience of the hopper 112. The piezo-electric actuator 126 is configured to vibrate the rod arm 180 such that the rod arm 180 vibrates the connecting member 184. The connecting member 184 causes the insert 176 and through it the hopper 112 to be vibrated. Vibration of the hopper 112 is used to affect powder flow characteristics. In alternative embodiments other types of actuator may be used, such as a solenoid actuator or an eccentrically loaded motor.

The hopper 112 of this embodiment includes two inner stirrers 186 and two outer stirrers 188, e.g. as shown in FIG. 9. The stirrers 186, 188 are held at their ends distal the hopper tip 174 in a sleeve 194. The outer stirrers 188 are positioned opposite one another and proximate the edge of the hopper 112. The inner stirrers 186 are positioned on opposite sides of the pin 116, and extend for most of their length through grooves 187 in the pin 116, extending from the pin 116 into the hopper 112 proximate the hopper tip 174. The inner stirrers 186 extend further towards the tip 174 than the outer stirrers 188, as the conical portion 115 limits the length of the outer stirrers 188. However, in some embodiments the stirrers 186, 188 may be angled to lie parallel and close to the conical portion 115 of the hopper 112, to minimise the unstirred area.

A collar 196 bolted to the pin 116 has a pin 198 offset from axis Y-Y that extends into a corresponding aperture in the sleeve 194. The sleeve 194, and with it the stirrers 186, 188, are thereby rotated with the pin 116 by the rotation motor 130. The stirrers 186, 188 do not in this embodiment reciprocate with the pin 116 as the collar 196 moves along the axis Y-Y independent to the sleeve 194 as the pin 116 reciprocates. In alternative embodiments, the stirrers 186, 188 rotate independently to one another and the pin 116, and reciprocate with or independently to the pin 116.

The dispensing system 178 is linked to the drive system 120 by a releasable coupling 190 located above the pin 116. In this embodiment the coupling 190 uses permanent magnets which provide sufficient force to transmit the drive but which are able to be manually split to aid rapid changeover and maintenance. The magnetic coupling 190 transfers vertical load but little torsional load. The coupling 190 includes a pin (not shown) through which torsional load is transferred. In other embodiments, alternative torsional drive formations may be used. The coupling 190 allows the dispensing system 178 to easily be removed from the remainder of the powder doser 110, allowing it to be swiftly cleaned, replaced or repaired when required, for example if some part of the dispensing system 178 is damaged, or a different format or size of pin 116 and/or hopper 112 is needed.

A number of advantages are provided by the powder doser 110. In this embodiment the pin 116 contacts the insert 176 rather than a silicone rubber portion of the hopper 112 at the aperture 114. The insert 176, being of stainless steel or some other rigid material, wears significantly more slowly than silicone rubber, allowing the dispensing system 178 to remain in use for longer periods of time. When dosing hard materials the tip may be made of a very hard material such as tool steel or tungsten carbide. Vibration of the hopper 112 taking place through the insert 176 improves vibration transfer and thereby reduces the problem of bridging. The releasable coupling 190 allows swift and easy removal of the whole dispensing system 178 when required. The positioning and different lengths of the inner and outer stirrers 186, 188 ensure that stirring occurs throughout the hopper 112.

The powder doser 110 of the second embodiment can be used with the transfer system 60 and weigh cell 42 of the previous embodiment. The powder doser 110 may be controlled so as to operate in a similar way as that of the previous embodiment. In addition, the drive and dispensing components are likewise arranged on a single plane in order for multiple dispensers to be placed side by side and/or staggered.

The invention claimed is:

1. A powder doser for accurately dispensing powder, for example a pharmaceutical substance, into a receptacle, the powder doser comprising:
    a hopper with a tip having an aperture through which powder may flow;
    a closure to close the aperture;
    a vibration device configured to agitate the hopper; and
    a pin located within the hopper proximate the aperture and arranged to rotate and to reciprocate in relation to the aperture;
    wherein a first portion of the hopper is formed of flexible material and a second portion proximate the tip is formed of substantially rigid material, wherein the first portion of the hopper is formed of resilient material; and
    wherein the vibration device is configured to agitate the hopper through the second portion.

2. A powder doser according to claim 1, wherein the second portion is formed of metal or metal alloy.

3. A powder doser according to claim wherein the second portion extends between 5% and 100% of the way up a conical portion of the hopper.

4. A powder doser according to claim 1, wherein the vibration device is remote from the second portion.

5. A powder doser according to claim 4, wherein the vibration device is linked to the hopper by means of a rod arm.

6. A powder doser according to claim 1, wherein the vibration device is a piezo-electric actuator.

7. A powder doser according to claim 1, further comprising a stirrer located within the hopper and arranged to rotate within the hopper.

8. A powder doser according to claim 1, comprising a dispensing system and a drive system, the dispensing system comprising the hopper, the closure and the vibration device.

9. A powder doser according to claim 8, wherein the dispensing system is linked to the drive system by means of a releasable coupling, and wherein the dispensing system is detachable from the drive system through operation of the releasable coupling.

10. A powder doser according to claim 1, wherein a tip of the pin is the closure.

11. A powder doser according to claim 7, wherein the stirrer maintains a substantially constant vertical position relative to the aperture.

12. A powder doser according to claim 1, further comprising a weighing device and a control system, the control system being configured to cause the powder doser to dispense a predetermined amount of powder into a receptacle positioned on the weighing device.

* * * * *